United States Patent
Bocquet et al.

(10) Patent No.: US 7,787,824 B2
(45) Date of Patent: Aug. 31, 2010

(54) RECEIVER, TRANSMISSION DEVICE AND RECEIVING METHOD

(75) Inventors: Wladimir Bocquet, Koto (JP); Michiharu Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 607 days.

(21) Appl. No.: 11/698,050

(22) Filed: Jan. 26, 2007

(65) Prior Publication Data

US 2007/0188381 A1    Aug. 16, 2007

Related U.S. Application Data

(63) Continuation of application No. PCT/JP2004/011602, filed on Aug. 12, 2004.

(51) Int. Cl.
  H04B 7/00  (2006.01)
  H04K 3/00  (2006.01)

(52) U.S. Cl. .................. 455/59; 455/61; 455/562.1; 370/208; 370/334

(58) Field of Classification Search ............... 455/59, 455/61, 562.1; 370/208, 334, 343
See application file for complete search history.

(56) References Cited

U.S. PATENT DOCUMENTS

| | | | |
|---|---|---|---|
| 6,441,786 B1 | 8/2002 | Jasper et al. | |
| 7,352,819 B2 * | 4/2008 | Lakshmipathi et al. | 375/260 |
| 7,463,577 B2 * | 12/2008 | Sudo et al. | 370/208 |
| 2002/0191535 A1 | 12/2002 | Sugiyama et al. | |
| 2004/0135723 A1 | 7/2004 | Nakaya et al. | |

FOREIGN PATENT DOCUMENTS

| | | |
|---|---|---|
| JP | 2003-060604 | 2/2003 |
| JP | 2003-124907 | 4/2003 |
| JP | 2004-214857 | 7/2004 |

OTHER PUBLICATIONS

Hara et al, Capacity enhancement by virtual subcarrier assignment for OFDM-based wireless system, May 17, 2004, IEEE, vol. 3, pp. 1811-1815.*

A. Van Zelst, et al., "Implementation of a MIMO OFDM Based Wireless LAN System," *IEEE Trans. Signal. Process.* 52, No. 2, 2004, pp. 483-494.

P.W. Wolniansky, et al., "V-BLAST: An Architecture for Realizing Very High Data Rates Over the Rich Scattering Wireless Channel," *Proc. Int. Symposium on Advanced Radio Technologies*, Boulder, CO, Sep. 1998.

(Continued)

*Primary Examiner*—Lee Nguyen
(74) *Attorney, Agent, or Firm*—Hanify & King, P.C.

(57) ABSTRACT

An adaptive array antenna part receiving a plurality of transmitted signals in which sub-carrier signal components of predetermined values is suppressed before transmission in order to distinguish a plurality of transmission antenna, by means of the plurality of transmission antennas; a part calculating weight factors suppressing the sub-carrier signal components set in the predetermined values, among sub-carrier components included in a received signal; and a part applying the weight factors to the adaptive array antenna means and receiving the plurality of transmitted signals with distinguishing the same are provided.

4 Claims, 13 Drawing Sheets

OTHER PUBLICATIONS

A. Van Zelst, "Space Division Multiplexing Algorithm," *Proc. 10th Med.*, Electrotechnical Conference 200, pp. 1218-1221. MEIecon 2000.

A. Van Zelst, et al., "Implementation of a MIMO OFDM Based Wireless LAN System," IEEE Trans. Signal. Process. 52, No. 2, 2004; pp. 483-494.

P.W. Wolniansky, et al., "V-BLAST: An Architecture for Realizing Very High Data Rates Over the Rich Scattering Wireless Channel," *Proc. Int. Symposium on Advanced Radio Technologies*, Boulder, CO, Sep. 1998.

IEEE Std. 802. 16a-2003 dated Apr. 1, 2003. IEEE Standard for Local and metropolitan area networks Part 16: Air Interface for Fixed Broadband Wireless Access Systems— Amendment 2: Medium Access Control Modifications and Additional Physical Layer Specifications for 2-11 GHz.

\* cited by examiner

RECEIVER, TRANSMISSION DEVICE AND RECEIVING METHOD

CROSS-REFERENCE TO RELATED APPLICATION

This application is a U.S. continuation application filed under 35 USC 111 (a) claiming benefit under 35 USC 120 and 365 (c) of PCT application JP04/011602, filed Aug. 12, 2004. The foregoing application is hereby incorporated herein by reference.

BACKGROUND OF THE INVENTION

1. Field of the Invention

The present invention generally relates to a technical field of radio communication, and, in particular, to a receiver and a receiving method for separating signals transmitted from a plurality of transmission antennas into the respective ones.

2. Description of the Related Art

In such a type of technology, in view of increasing a communication capacity, a radio communication technology of a multi-input multi-output (MIMO) method has attracted attention. In this technology, a plurality of antennas are provided in each of a transmission side and a reception side, channels created between the respective antennas are used, and thus, a communication capacity is increased (see non-patent document 1, mentioned below, for example for the MIMO method). Further, in view of increasing frequency usage efficiency in addition to bearing force against a multi-path propagation environment, a radio communication technology of an orthogonal frequency division multiplexing (OFDM) method has attracted attention. In the OFDM method, signals are transmitted with the use of a plurality of mutually orthogonal sub-carriers disposed on a frequency axis, and thus, frequency selective fading or an influence of multi-path environment are suppressed. Further, a radio communication system in which the MIMO method and the OFDM method are combined has been taken a hopeful view (see non-patent document 2, mentioned below, for such a system).

FIG. 1 shows a general outline of the MIMO method. As shows, N antennas are provided on a transmission side, transmitted signals $x_0$ through $x_{Nt-1}$ are transmitted from the respective antennas. These transmitted signals are transmitted at the same time at the same frequency, but distances and disposing manners among these respective transmission antennas are appropriately set so that these can be transmitted independently. The transmitted signals transmitted from the respective antennas are received by $N_r (\geq N_t)$ reception antennas, and thus, $N_r$ received signals $y_0$ through $y_{Nr-1}$ are obtained. In the figure, signals $n_0$ through $n_{Nr-1}$ added to the respective received signals show noise components, respectively. Radio sections between the transmission antennas and the reception antennas are represented by a channel matrix H, and each matrix element $H_{nm}$ corresponds to a channel transfer function between the m-th transmission antenna and the n-th reception antenna. In the example of the figure, $0 \leq m \leq N_t-1$ and $0 \leq n \leq N_r-1$.

FIG. 2 shows a general outline of a transmitter in a common OFDM method. A transmitted signal, after being modulated, mapped in a predetermined signal point, undergoes serial to parallel conversion (S/P 202), undergoes inverse fast Fourier transform (IFFT 204), and thus, modulation according to the OFDM is carried out. Signals in a time domain after IFFT undergo parallel to serial conversion (P/S 206), guard intervals are added thereto (GI 208), and after that, the signals are transmitted from transmission antennas 210. It is noted that, as a mapping method of the signals, QPSK, 16QAM, 64QAM or other arbitrary method, may be adopted.

FIG. 3 shows a general outline of a receiver in a common OFDM method. The guard intervals of signals received by reception antennas 302 are removed (-GI 306). After that, the received signals undergo serial to parallel conversion (S/P 306), and undergo fast Fourier transform (FFT 308). Thereby, demodulation according to the OFDM method is carried out. The signals in a frequency domain after the transform undergo parallel to serial conversion (P/S 310), then undergo demodulation (312), and undergo other processing such as decoding.

FIG. 4 shows a general outline of a transmitter used in a system combining the MIMO method and the OFDM method. As shown, $N_t$ transmitted signals are separated into $N_t$ signals by means of serial to parallel conversion (S/P 402). The respective $N_t$ signals separately undergo signal processing, and then, are transmitted from $N_t$ transmission antennas separately. For example, a first transmitted signal is encoded (404-1), mapped (406-1), undergoes inverse fast Fourier transform (408-1), then, a guard interval is added thereto (410-1), and the signal is transmitted from a transmission antenna 412-1. the other transmitted signals are processed in the same manner, and thus, are transmitted.

FIG. 5 shows a general outline of a receiver used in the system combining the MIMO method and the OFDM method. As shown, received signals are received by $N_r$ reception antennas 502-1 through $N_r$, guard intervals are removed therefrom (504-1 through $N_r$), and separately undergo fast Fourier transform (506-1 through $N_r$). The signals after undergoing the Fourier transform are separated into $N_t$ transmitted signals (508), and demodulation and decoding are carried out on each of these transmitted signals.

For the signal processing in the signal separation part 508, there are various methods for separating the respective transmitted signals transmitted from the plurality of transmission antennas, from the signals received by the plurality reception antennas. A first method utilizes an algorithm called a zero forcing method. In this method, a pseudo inverse matrix $H^+$ of a channel matrix H is calculated, the received signal is multiplied by the pseudo inverse matrix, and thus, the transmitted signal is obtained.

A second method utilizes an algorithm called a minimum mean squire error (MMSE) method. In this method, the received signal is multiplied by a matrix expressed by $(\alpha I + H^*H)^{-1}H^*$, and thus, the transmitted signal is obtained. There, $\alpha$ denotes a reciprocal of a signal to noise ratio ($SNR^{-1}$), I denotes a unit matrix, and $H^*$ denotes a conjugate transposed matrix of the matrix H.

A third method utilizes an algorithm called a zero forcing BLAST (ZF-BLAST: Zero Forcing Bell Laboratories Layered Space Time) method. In this method, separation and removal of the signal from the transmission antenna are carried out repetitively, and thus, high-speed data transmission is achieved (for this method, see a non-patent document 3, mentioned below).

A fourth method utilizes an algorithm called a minimum mean square error BLAST (MMSE BlAST: Minimum Mean Squire BLAST) method. In this method, the minimum mean square error method and the BLAST method are combined.

A fifth method utilizes an algorithm called a maximum likelihood decoding (MLD) method. In this method, squire Euclidean distances between combinations of all the possible transmitted symbols and the received signals, and a combination providing a minimum distance is determined as a most likelihood transmitted signal.

[Non-Patent Document 1] A. Van Zelst, "Space division multiplexing algorithm", Proc. 10th Med. Electrotechnical Conference 2000, pp. 1218-1221;

[Non-Patent Document 2] A. Van Zelst et al., "Implementation of a MIMO OFDM based wireless LAN system", IEEE Trans. Signal. Process. 52, no. 2, 2004, pp. 483-494; and

[Non-Patent Document 3] P. W. Wolniansky et al., "V-BLAST: An architecture for realizing very high data rates over the rich scattering wireless channel", in Proc. Int. Symposium on Advanced Radio Technologies, Boulder, Colo., September 1998.

SUMMARY OF THE INVENTION

Received signals can be separated into respective ones of a plurality of transmitted signals by means of these various methods. However, a required operation burden is not so light when any method is adopted. Generally speaking, a signal separation accuracy and a signal estimation accuracy increase in the stated order of the first through fifth methods. However, an operation burden required for signal processing also tends to increase. Especially, the fifth method requires distance calculation for all the possible signal point combination number, i.e., a combination number as large as (the number of possible symbol mapping signal points)$^{(the\ number\ of\ transmission\ antennas)}$. Thus, a very heavy operation burden is required. When the first method is adopted, an operation burden required for obtaining an inverse matrix is not so light. Accordingly, although a communication system of the MIMO method or combining the MIMO method and another method has properties which are hopeful in future, a problem is that a heavy operation burden is required for distinguishing the plurality of transmitted signals transmitted from the plurality of transmission antennas simultaneously. This fact causes disadvantageousness especially for such a product application as those for a cellular phone or a handy mobile terminal.

The present invention has been devised in consideration of the above-mentioned problems, and an object of the present invention is to provide a receiver and a receiving method by which an operation burden required for separating received signals including a plurality of transmitted signals transmitted from a plurality of transmission antennas into the respective transmitted signals can be reduced.

A receiver used in the present invention is characterized to include:

an adaptive array antenna part receiving a plurality of transmitted signal in which sub-carrier signal components of predetermined values are suppressed before transmission in order to distinguish a plurality of transmission antennas, from the transmission antennas;

a part calculating weight factors suppressing the sub-carrier signal components set in the predetermined values, among sub-carrier components included in a received signal; and a part applying the weight factors to the adaptive array antenna part and receiving the plurality of transmitted signals with distinguishing them.

According to the present invention, in a receiver receiving a plurality of transmitted signals simultaneously transmitted by a plurality of transmission antennas, an operation burden required for separating the received signals into the respective transmitted signals can be reduced.

DESCRIPTION OF REFERENCE NUMERALS

Figure 1:
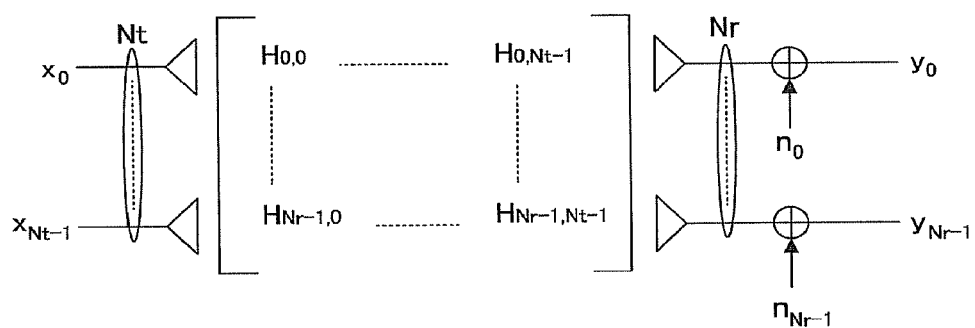
FIG. 1 shows a general outline of a radio communication system in a MIMO method.
Figure 2:
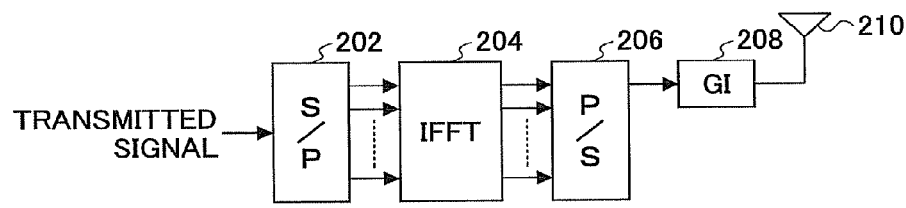
FIG. 2 shows a general outline of a transmitter in an OFDM method.
Figure 3:
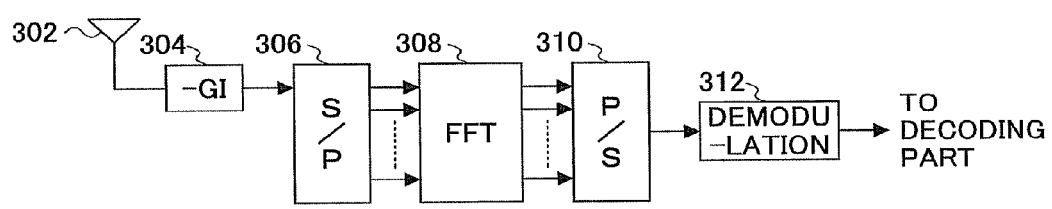
FIG. 3 shows a general outline of a receiver in the OFDM method.

202 serial to parallel conversion part; 204 inverse fast Fourier transform part; 206 parallel to serial conversion part; 208 guard interval adding part; 210 transmission antenna;

302 reception antenna; 304 guard interval removing part; 306 serial to parallel conversion part; 308 fast Fourier transform part; 310 parallel to serial conversion part;

402 serial to parallel conversion part; 404-1 through $N_t$ encoders; 406-1 through $N_t$ mapping parts; 408-1 through $N_t$ inverse fast Fourier transform parts; 410-1 through $N_t$ guard interval adding parts; 412-1 through $N_t$ transmission antenna parts;

502-1 through $N_r$ reception antenna parts; 504-1 through $N_r$ guard interval removing parts; 506-1 through $N_r$ fast Fourier transform parts; 508-1 through $N_r$ signal separation parts;

602-1 through $N_A$ antenna elements; 604-1 through $N_A$ guard interval removing parts; 606-1, 2 signal separation parts; 608-1 through $N_A$ weight multiplying parts; 610 adding part; 612, 612' fast Fourier transform parts; 614 channel compensation part; 616 demodulation part; 618, 618' weight control parts;

710, 720 transmission antennas;

1002-1 through $N_A$ antenna elements; 1004-1 through $N_A$ guard interval removing parts; 1008-1 through $N_A$ weight multiplying parts; 1010 adding part; 1012 fast Fourier transform part; 1014 channel compensation part; 1016, 1018 multiplying parts; 1020 adding part; 1022 parallel to serial conversion part; 1024 demodulation part; 1026 weight control part;

1102 fast Fourier transform part; 1104 virtual sub-carrier setting part; 1106 inverse fast Fourier transform part; 1108 parallel to serial conversion part; 1110 encoding part; 1112 mapping part; 1114 serial to parallel conversion part; 1116 digital to analog conversion part; 1118 frequency converting part; 1120 transmission antenna;

1202-1 through $N_A$ reception antennas; 1204-1 through $N_A$ band pass filters; 1206-1 through $N_A$ frequency converting parts; 1208-1 through $N_A$ analog to digital conversion parts; 1210-1 through $N_A$ guard interval removing parts; 1212-1 through $N_A$ weight multiplying parts; 1214 adding part; 1216 serial to parallel part; 1218 fast Fourier transform part; 1220 channel compensation part; 1222 multiplying part; 1224 inverse fast Fourier transform part; 1226 parallel to serial conversion part; 1228 demodulation part; 1230 weight control part; 1232 selective signal line;

DETAILED DESCRIPTION OF THE PREFERRED EMBODIMENTS

According to an embodiment of the present invention, a plurality of transmitted signals transmitted from a plurality of transmission antennas are received by an adaptive array antenna part. The plurality of transmitted signals are distinguished from each other by a positional relationship of sub-carrier set that have predetermined values before transmission. Weight factors suppressing signal components of the sub-carrier set that is associated to the transmitted signal that is being distinguished are calculated. The weight factors are applied to the adaptive array antenna part, then the directivity is formed so that the one or plurality of transmitted signals other than the transmitted signal that is being distinguished are suppressed.

Thereby, without executing such a signal separation method as that carried out in the MIMO method receiver, the respective transmitted signals can be distinguished with the use of directivity oriented to a coming direction of each transmitted signal. The weight factors providing the advantageous directivity are introduced by using knowledge concerning the sub-carriers which are not used in data transmission. That is, the weight factors are calculated in such a manner that the predetermined sub-carrier components included in the received signal are suppressed, and an operation burden required at this time is relatively light in comparison to the signal separation in the MIMO method. Accordingly, it is possible to reduce the operation burden required for separating the respective transmitted signals from the received signal which includes the plurality of transmitted signals transmitted from the plurality of transmission antennas.

According to an embodiment of the present invention, the above-mentioned predetermined value is substantially zero. Thereby, adaptive control is carried out and the weight factors are set in such a manner that the signal components of the sub-carriers not used in data transmission may be zero.

According to an embodiment of the present invention, the signal received by the adaptive array antenna part includes signals transmitted simultaneously at a same time from the plurality of transmission antennas.

According to an embodiment of the present invention, the signal received by the adaptive array antenna part is a signal modulated by an orthogonal frequency division multiplexing (OFDM) method. Also, in an embodiment, the signal received by the adaptive array antenna part is a signal modulated by a multi-carrier code division multiplexing (MC-CDMA) method.

A receiver according to an embodiment uses a weight factor for suppressing a signal transmitted from at least one transmission antenna other than a certain transmission antenna within a certain period received by the adaptive array antenna part, to receive a signal transmitted from the certain transmission antenna within another period.- Thereby, the weight factor is set, not in such a manner that the transmitted signal is maximized, but in such a manner that the transmitted signal is suppressed. Accordingly, it is possible to appropriately and efficiently set the weight factor suitable to each transmission antenna.

According to an embodiment of the present invention, a receiver receiving first and second transmitted signals transmitted from first and second transmission antennas is used. The receiver is characterized to include an adaptive array antenna part including a plurality of antenna elements for receiving the first transmitted signal in which a first sub-carrier component is set in a predetermined value and a second transmitted signal in which a second sub-carrier component is set in the predetermined value; a weight control part for calculating first and second weight factors respectively suppressing the first and second sub-carrier components included in a received signal after undergoing Fourier transform; and a part applying the first and second weight factors to the adaptive array antenna part and distinguishing each transmitted signal.

According to an embodiment of the present invention, at least one of the first and second sub-carriers set in the predetermined value includes a plurality of sub-carriers. Thereby, a degree of freedom of distinguishing the plurality of transmitted signals from each other increases.

According to an embodiment of the present invention, the signal received by the adaptive array antenna part includes a single carrier signal, which has had, in a transmission side, Fourier transform carried out thereon, the first and second sub-carrier components set in the predetermined value, inverse Fourier transform carried out thereon, and then transmitted. Thereby, it is possible to apply the present invention to a communication system of a single carrier type.

According to an embodiment of the present invention, the first and second transmitted signals, transmitted in different time slots, are received separately. Further, the second transmitted signal is received with the use of a weight factor for suppressing the received first transmitted signal.

Below, examples in which the present invention is applied to a MIMO-OFDM method (embodiment 1), a MIMO-OFDM-CDMA method (embodiment 2) and a MIMO-single-carrier method (embodiment 3), as well as another embodiment (embodiment 4), are described.

Embodiment 1

Figure 6:
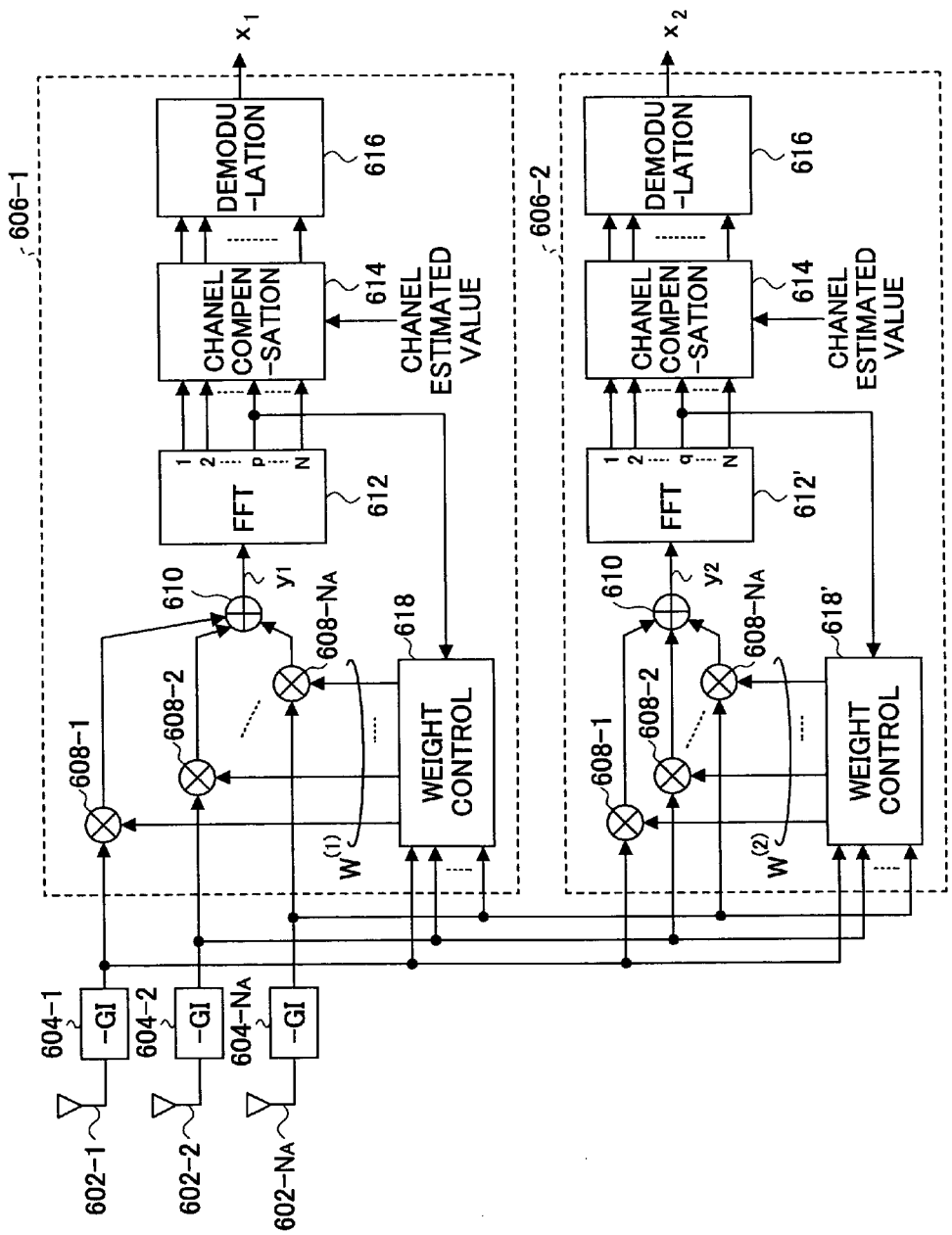
FIG. 6 shows a block diagram of a receiver in one embodiment of the present invention.

FIG. 6 shows a general outline of a receiver in one embodiment of the present invention. In the embodiment, the MIMO method and the OFDM method are adopted. As to a transmitter, a configuration shown in FIG. 4 may be adopted. For the purpose of simplification, it is assumed that the transmitter has two transmission antennas, and, therefrom, two types of transmitted signals $x_1$ and $x_2$ are transmitted simultaneously at the same frequency. The receiver shown in FIG. 6 has a plurality of ($N_A$) antenna elements 602-1 through $N_A$, $N_A$ guard interval removing parts (-GI) 604-1 through $N_A$, a first signal separating part 606-1, a second signal separating part 606-2. The first and second signal separating parts 606-1, 2 have substantially the same configuration, and description therefor is made for the first signal separating part 606-1 as a representative. The first signal separating part 606-1 has $N_A$ weight multiplying parts 608-1 through $N_A$, an adding part 610, a fast Fourier transform part (FFT) 612, a channel compensation part 614, a demodulation part 616 and a weight control part 618.

Mutual positional relationship among the $N_A$ antenna elements 602-1 through $N_A$ is determined in such a manner that the entirety of the $N_A$ antenna elements forms a single adaptive array antenna. There are various manners to achieve the adaptive array antenna. One example is an equal spacing linear disposed array antenna in which adjacent antenna elements are disposed at a distance of a half-wave length of a received signal.

The guard interval removing part (-GI) 604-1 through $N_A$ remove signal parts corresponding guard intervals from signals received by the respective antenna elements.

The first signal separating part 606-1 carries out signal processing concerning the first transmitted signal $x_1$ included in the received signal. The second signal separating part 606-2 carries out signal processing concerning the second transmitted signal $x_2$ included in the received signals. As mentioned above, the first and second signal separating parts 606-1, 2 have substantially the same configuration. Thus, the first signal separating part 606-1 is described, as a representative. It is noted that, the number of signal separating parts is set according to types of the transmitted signals, that is, the number of transmission antennas.

The $N_A$ weight multiplying parts 608-1 through $N_A$ are set to correspond to the respective ones of the antenna elements 602-1 through $N_A$, and multiply weights or weight factors to signals received by the respective antenna elements.

The adding part 610 combines the weighted received signals.

The fast Fourier transform part 612 carries out Fourier transform on the weighted received signal, and demodulates in the OFDM method. More accurately, discrete fast Fourier transform (DFT) is carried out. Thereby, the received signal in a frequency domain are generated, and thus, the N sub-carrier components of the received signal are obtained.

The channel compensation part 614 obtains a channel estimated value based on the received signal and a known signal, and corrects the received signal for each sub-carrier in such a manner that signal distortion introduced in the channel may be compensated.

The demodulation part 616 carries out data demodulation based on the received signal after the channel compensation, and outputs the demodulation result to a decoding part (not shown).

The weight control part 618 calculates a group of weight factors $w^{(1)}=(w_1, \ldots, W_{N_A})$, based on a part of the signals from the respective antenna elements and the signals from the fast Fourier transform part 612, and provides these weight factors to the weight multiplying parts 608-1 through $N_A$. Different from an ordinary adaptive array antenna weight control, in the present embodiment, the weight factors are determined in such a manner that certain sub-carrier components (in the example of the figure, p-th sub-carrier component) of the output of the fast Fourier transform part 612 may be suppressed. Further, a weight control part 618' in the second signal separating part 606-2 determines the weight factors in such a manner that the q-th (q≠p) sub-carrier component in the received signal is suppressed. A method of determining the weight factors will become apparent from the following description of operation.

Figure 7:
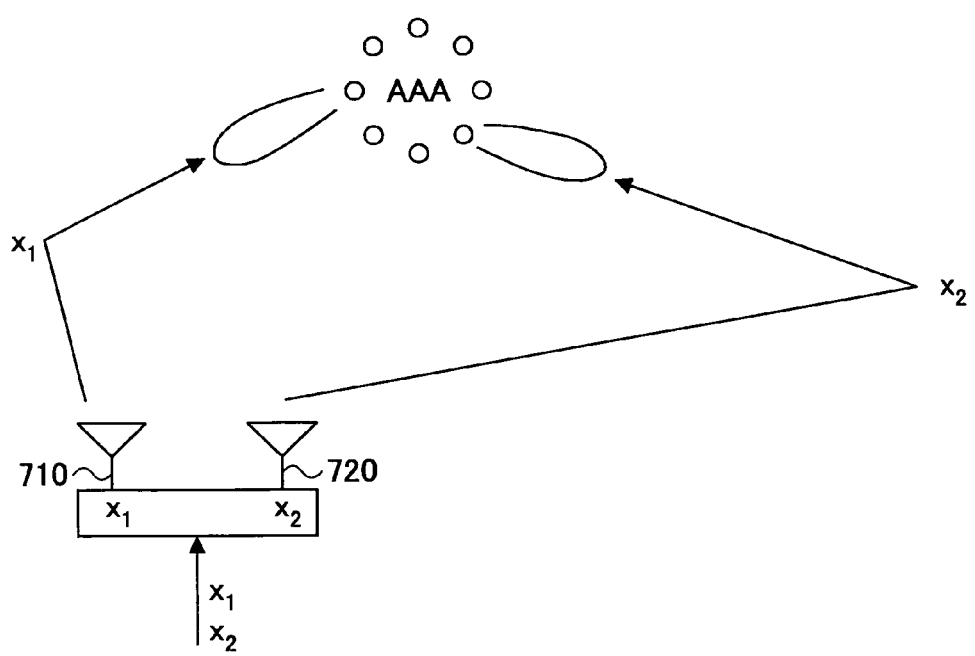
FIG. 7 illustrates operation of the embodiment of the present invention.

With reference to FIG. 7, and related figures, operation will now be described. The different transmitted signals $x_1$ and $x_2$ are transmitted from the two transmission antennas 710 and 720, respectively. The transmission antennas 710, 720 are set as being not mutually correlated with, and the first and second transmitted signals are transmitted simultaneously at the same frequency. This point is the same as the transmitter of the MIMO method described with reference to FIG. 4. In the figure, AAA denotes the adaptive array antenna in the receiver of FIG. 6, and a plurality of antenna elements are shown by 8 white circles. Further, in FIG. 7, two curves representing directivity of the adaptive array antenna are shown (description therefor will be made later).

In the transmitted signals of the OFDM method, data is mapped to the plurality of sub-carriers, and inverse fast Fourier transform is carried out. Thereby, demodulation in the OFDM method is carried out. Each sub-carrier is spaced mutually by a multiple of a reciprocal of 1 symbol period, and the sub-carriers have such a positional relationship that they are mutually orthogonal. Accordingly, the transmitted signals $x_1, x_2$ have many frequency components (sub-carrier components) on a frequency axis as shown in the top half of FIG. 8. However, data is not mapped to some sub-carriers such as the p-th sub-carrier concerning the transmitted signal $x_1$, and the q-th sub-carrier concerning the second transmitted signal $x_2$. These sub-carriers not used in data transmission (called 'virtual sub-carriers') are set for the purpose of, for example, suppressing DC offset components, avoiding interference from adjacent bands, or such. The positions of the sub-carries not used in data transmission may be determined according to a standard, may be determined by a system operator, or may be determined from another view point. In any method, the fact that these sub-carriers are not used in data transmission should be known by both of the transmission and reception sides, and the plurality of transmitted signals should be distinguishable from the positional relationship of the virtual sub-carriers.

The first and second transmitted signals $x_1$ and $x_2$ are transmitted from the different transmission antennas 710 and 720. At the time of transmission, the respective signals have frequency characteristics as shown in the top part of FIG. 8. They reach the adaptive array antenna 602-1 through 602-$N_A$ of the receiver through different channels (at least partially different), and the first and second transmitted signals are received as first and second received signals $y_1$ and $y_2$. The first received signal $y_1$ is a signal obtained as a result of the received signals received by the adaptive array antenna being weighted by the weight factors $w^{(1)}$ determined by the weight control part 618 and added by the adding part 610. The second received signal $y_2$ is a signal obtained as a result of the received signals received by the adaptive array antenna being weighted by the weight factors $w^{(2)}$ determined by the weight control part 618' and added by the adding part 610.

Figure 8:
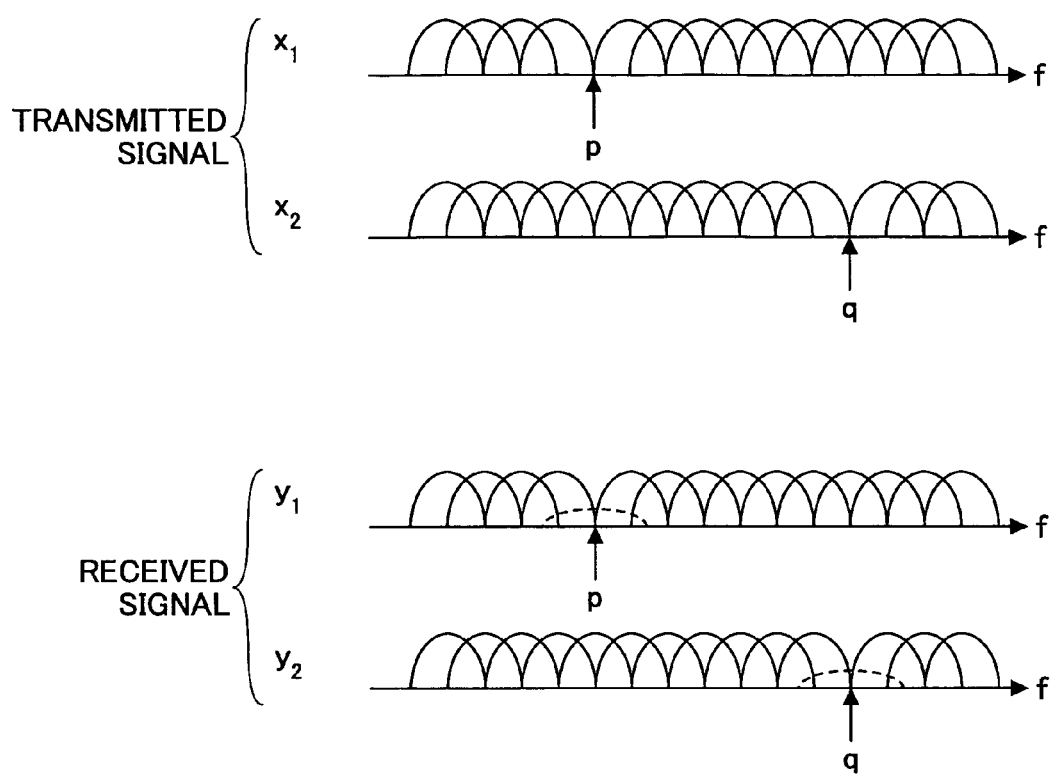
FIG. 8 shows transmitted signals and received signals on a frequency axis.

As shown in FIG. 8, the p-th sub-carrier component of the first transmitted signal $x_1$ is zero, and thus, it is expected that the p-th sub-carrier component of the first received signal $y_1$ is zero. However, mainly from a fact that, when the first received signal $y_1$ is received, the second received signal $y_2$ is simultaneously received, it is possible that the p-th sub-carrier component of the first received signal $y_1$ has a non-zero signal component. Such a signal component is an interference component, and is shown by a broken line around the p-th sub-carrier of the first received signal $y_1$ in the bottom part of FIG. 8. All of the frequency components included in the first received signal $y_1$ are obtained from the output signal of the FFT part 612 of FIG. 6, and the signal component concerning the p-th sub-carrier is provided to the weight control part 618.

The weight control part 618 calculates an evaluation function or a cost function concerning the p-th sub-carrier component, and calculates the group of the weight factors $w^{(1)}=(w_1, W_2, \ldots, W_{NA})$ in such a manner as to minimize the evaluation function, i.e., the p-th sub-carrier component becomes zero. Various function forms may be considered as the evaluation function. For example, the following function may be adopted:

$$|\xi_R(i)|^2 = \sum_{j=N-1}^{i} \lambda^{i-j} |w^H R_P|^2$$

There, i denotes a parameter indicating the number of iterating times, λ denotes a forgetting factor having a value of 0.995 or such, $w^H$ denotes a conjugate transposed vector of a vector having components of the weight factors, and $R_p$ denotes an amount indicating the p-th sub-carrier component. For a method of calculating the weight factors, known technology such as a minimum mean squire error method such as a recursive least squire (RLS) method, a least means squire (LMS) method, or such, may be utilized. The weight factors used for the adaptive array antenna are calculated based on knowledge concerning the virtual sub-carriers when the correspondence relationship between the transmitted signals and the virtual sub-carriers (sub-carriers to which data is not mapped) is known.

When the weight factor $w^{(1)}$ suppressing the p-th sub-carrier component is provided to the respective antenna elements by the weight multiplying parts 608-1 through $N_A$, the directivity of the adaptive array antenna becomes such that null is oriented toward a coming direction of the second transmitted signal $x_2$, as shown in FIG. 7. When the p-th sub-carrier component is sufficiently suppressed, the signal demodulated based on the first received signal $y_1$ accurately indicates the first transmitted signal $x_1$.

Similarly, also for the second received signal $y_2$, it is expected that the q-th sub-carrier component is zero. However, from the first received signal $y_1$, an interference component occurs in the q-th sub-carrier. The q-th sub-carrier component is extracted from the second received signal $y_2$, is provided to the weight control part 618', and the group of weight factors $w^{(2)}$ are calculated such that the q-th sub-carrier component may be suppressed. When these weight factors are provided to the respective antenna elements by the weight multiplying parts 608-1 through $N_A$ concerning the second received signal, the directivity of the adaptive array antenna becomes such that null is oriented toward a coming direction of the first transmitted signal $x_1$. When the q-th sub-carrier component is sufficiently suppressed, the signal demodulated based on the second received signal $y_2$ accurately indicates the second transmitted signal $x_2$.

The sub-carriers not used in data transmission may be one or some in the single transmitted signal. The plurality of transmitted signals transmitted from the plurality of transmission antennas should be mutually distinguishable weight the use of the positional relationship of the virtual sub-carriers. Accordingly, when the plurality of sub-carriers are included in the single transmitted signal, the different transmitted signals have the virtual sub-carriers at least partially different thereamong. The positions of the virtual sub-carriers may be set in various manners, as mentioned above. Not only a frequency already set as a non-use frequency may be used as the virtual sub-carrier, but also some of sub-carriers which may be used in data transmission may be set as the virtual sub-carriers. In this case, data transmission quality may degrade from the new setting of the virtual sub-carriers. However, when the degradation falls within a compensateable range of degradation in communication environment, the degradation can be compensated by means of error correction or another compensation technology. When the frequency already set as a non-use frequency is used as the virtual sub-carrier, it is also possible to ensure the non-use frequency by changing a cut-off frequency of a filter.

According to the IEEE802.11a/g rule, two consecutive OFDM symbols (which may be referred to as a first symbol and a second symbol, if necessary for the sake of convenience) having the same contents are transmitted as a preamble sequence. When this rule is applied to the present embodiment, the virtual sub-carriers set in the first and second symbols (having the same contents) should be set in positions different from one another. For example, the first symbol has the p-th sub-carrier set as the virtual sub-carrier while the second symbol has the q-th sub-carrier set as the virtual sub-carrier (q≠p). Assuming that both the first and the second symbols had the p-th sub-carriers set as the virtual sub-carrier, the p-th sub-carrier component concerning the preamble sequence would become not known.

In the present embodiment, in the multi-output-type transmission device, in order to distinguish the radio waves output from the first and second antennas, frequency zones disposing no carriers are provided in multi-carriers output from the first and second antennas, and the frequency zones disposing no carriers are made different between the first and second antennas. The frequency zones disposing no carriers are realized by reducing the power of the frequency zones, and, an arbitrary state in which substantially no carriers are included when viewed from the reception side, may be used.

According to the present embodiment, the two types of transmitted signals are transmitted from the transmission side. However, the types of the transmitted signals or the number of the transmission antennas are not limited to the two. An any number of transmission antennas may be used. However, the number of the signal separating parts 606 corresponding to the number of the transmission antennas are required, and also, all the transmitted signals should be mutually distinguishable by the positions of the virtual sub-carriers.

Figure 9:
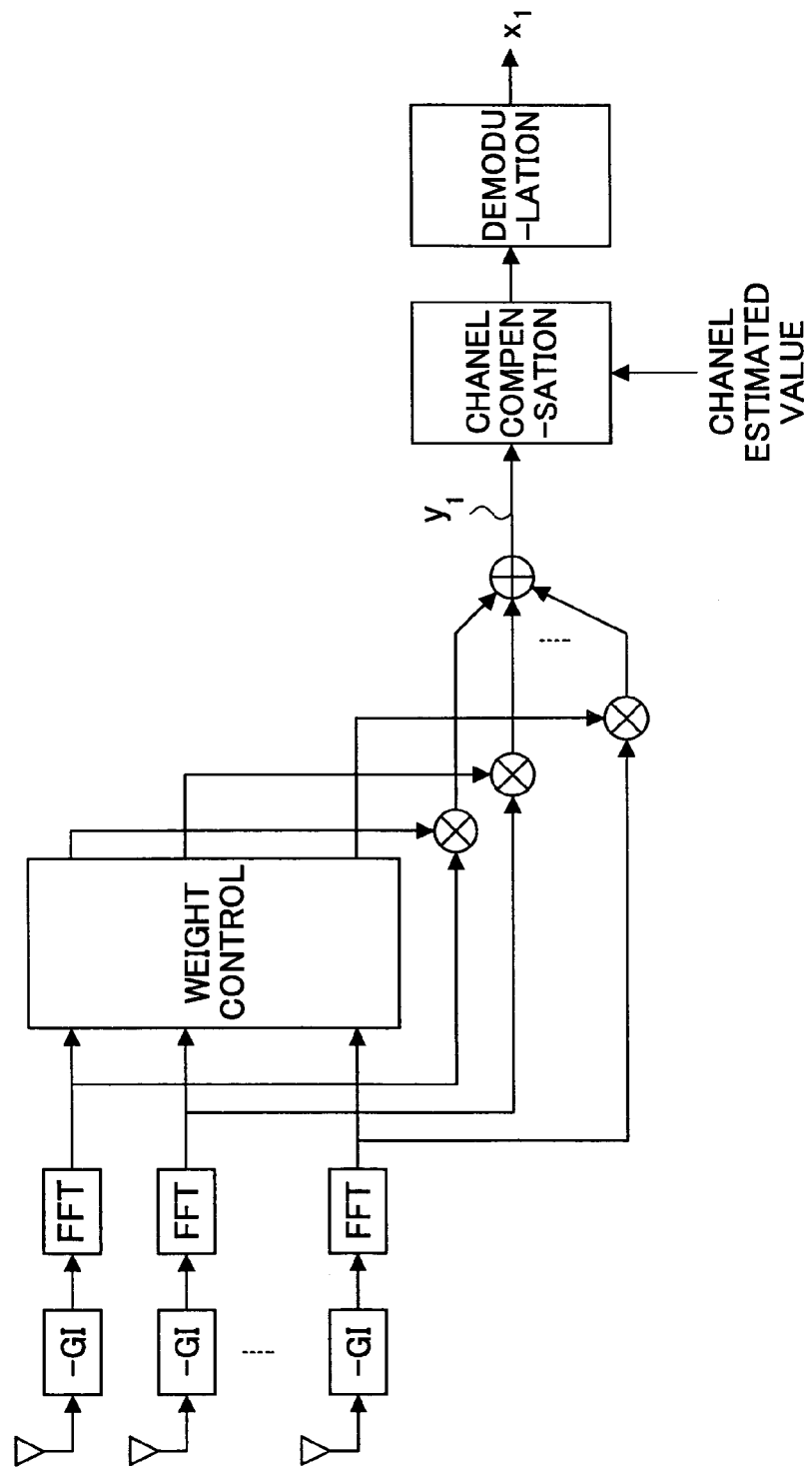
FIG. 9 shows a block diagram of a variant embodiment of the embodiment of the present invention.

FIG. 9 shows a variant embodiment of the receiver shown in FIG. 6. It is noted that, in FIG. 9, for the purpose of simplification, only a part concerning the first transmitted signal $x_1$ and the first received signal $y_1$ is shown. In each of both the receivers shown in FIGS. 9 and 6, for the first transmitted signal, the weight factor suppressing the p-th sub-carrier component of the received signal is calculated. Thereby, such a directivity that null is oriented toward the coming direction of the signal other than the first transmitted signal is obtained. In the receiver of FIG. 9, different from that of FIG. 6, fast Fourier transom is carried out on the signal before being input to the adding part.

Embodiment 2

Figure 10:
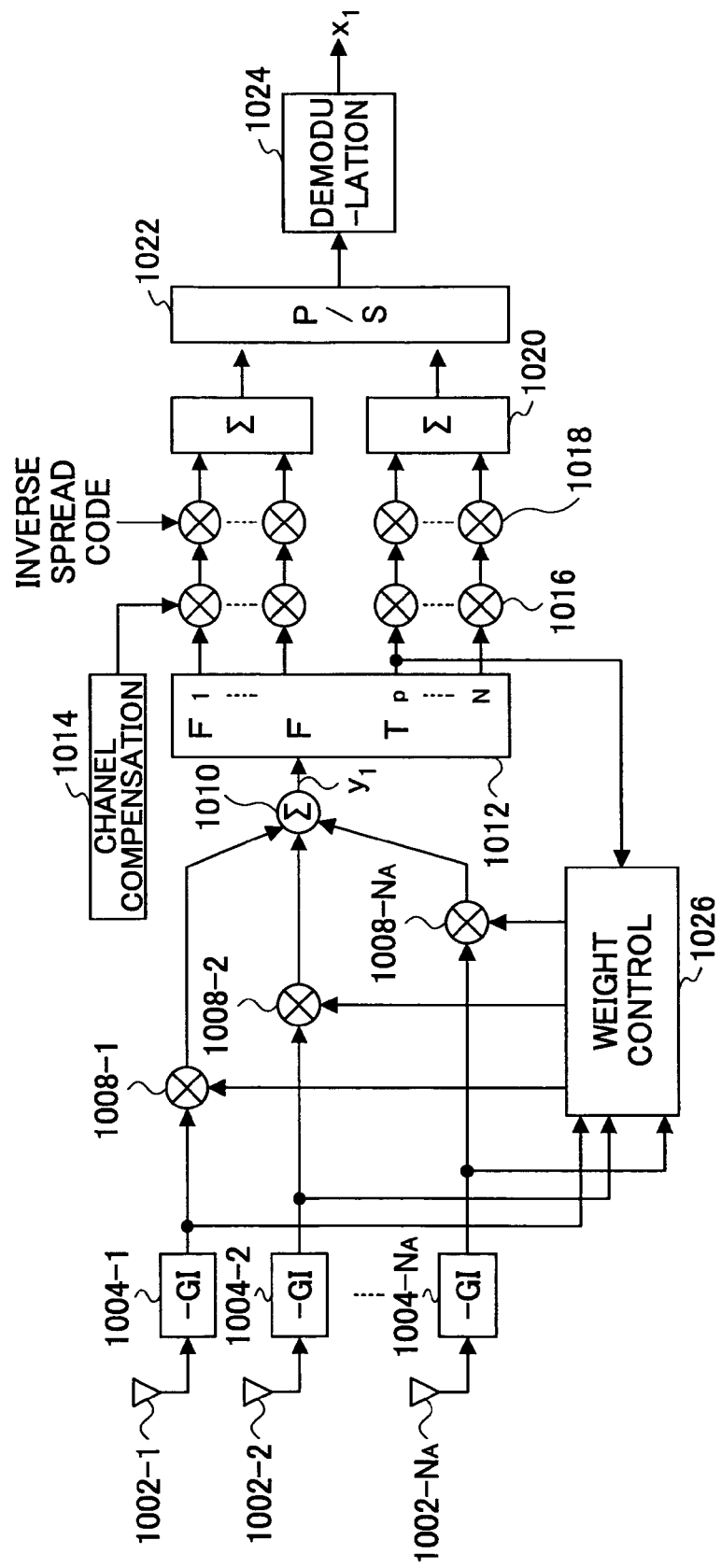
FIG. 10 shows a block diagram of a receiver in one embodiment of the present invention.

FIG. 10 shows a partial block diagram of a receiver in one embodiment of the present invention. The receiver according to the embodiment is used in a system combining the MIMO method, the OFDM method and the code division multiplexing (CDMA) method. It is noted that, for the purpose of simplification, only a part concerning a first transmitted signal $x_1$ and a first received signal $y_1$ is shown. As to a transmitter, it is possible to utilize a common transmitter (not shown) adopting the MIMO method, the OFDM method and the CDMA method. The receiver shown in FIG. 10 includes a plurality of ($N_A$) antenna elements 1004-1 through $N_A$, $N_A$ weight multiplying parts 1008-1 through $N_A$, an adding part 1010, a fast Fourier transform (FFT) part 1012, a channel compensation part 1014, several sub-carriers' multiplying parts 1016, 1018, a combining part 1020, a parallel to serial conversion part (P/S) 1022, a demodulation part 1024, and a weight control part 1026. For the purpose of convenience of showing in the figure, the several sub-carries' multiplying parts 1016 and 1018 are shown as having all the same reference numerals.

Mutual positional relationship among the $N_A$ antenna elements 1002-1 through $N_A$ is determined in such a manner that the entirety of the $N_A$ antenna elements form a single adaptive array antenna. The guard interval removing part (-GI) 1004-1 through $N_A$ remove signal parts corresponding guard intervals from signals received by the respective antenna elements. The $N_A$ weight multiplying parts 1008-1 through $N_A$ are set to correspond to the respective ones of the antenna elements 1002-1 through $N_A$, and multiply weights or weight factors to the signals received by the respective antenna elements. The adding part 1010 combines the weighted received signals.

The fast Fourier transform part 1012 carries out Fourier transform on the weighted received signal, and demodulates it in the OFDM method. Thereby, the received signal in a frequency domain is generated, and the received signal is obtained for the respective N sub-carrier components. The channel compensation part 1014 obtains a channel estimated value and corrects the received signal for each sub-carrier in such a manner that signal distortion introduced in the channel is compensated. The several sub-carriers' (N) multiplying part 1018 multiply the signals having undergone the Fourier transform by inverse spread codes. The combining part 1020 combines a predetermined number of the signals having undergone the inverse spread. The parallel to serial conversion part 1022 converts the thus-combined parallel signals into serial signals. The demodulation part 1024 carries out data demodulation and outputs the demodulation result to a decoding part (not shown).

The weight control part 1026 calculates weight factors based on a part (in the example of the figure, a p-th sub-carrier component) of the signals from the respective antenna elements and the signal from the fast Fourier transform part 1012, and provides these weight factors to the weight multiplying parts 1008-1 through $N_A$. Also in the present embodiment, the weight factors are determined so that the part of the output of the fast Fourier transform part 1012, i.e., the certain sub-carrier component (in the example of the figure, the p-th sub-carrier component) of the received signals is suppressed. When the weight factors suppressing the p-th sub-carrier component is provided to the respective antennas from the weight multiplying parts 1008-1 through $N_A$, the directivity of the adaptive array antenna becomes such that null is orientated toward the coming direction of the signal other than the first transmitted signal $x_1$. When the p-th sub-carrier component is sufficiently suppressed, the signal demodulated based on the first received signal $y_1$ accurately indicates the first transmitted signal $x_1$.

Embodiment 3

The examples described in the embodiments 1 and 2 use the communication systems adopting the multi-carrier method. Some of the plurality of sub-carriers are set as the virtual sub-carriers, the virtual sub-carrier components in the received signals are suppressed, and thus, the adaptive array antenna is adjusted in such a manner that the transmitted signals are distinguishable when the transmitted signals are received. Accordingly, it is not possible to apply this art to a communication system in a conventional single carrier method without any modification thereof. Below, an embodiment of applying the present invention to the MIMO method of the signal-carrier type will be described.

Figure 11:
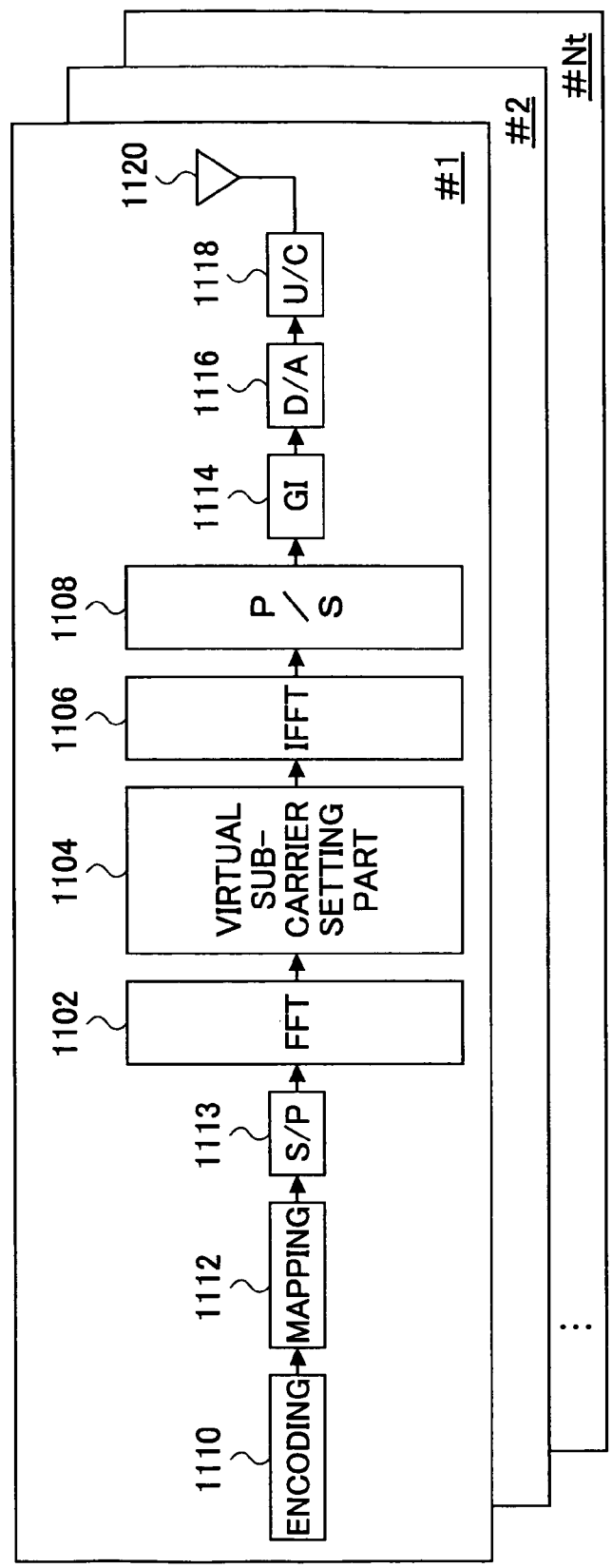
FIG. 11 shows a block diagram of a transmitter in the embodiment of the present invention.

FIG. 11 shows a partial block diagram of a transmitter in an embodiment of the present invention. This transmitter adopts the single-carrier type of in the MIMO method. The transmitter in the embodiment includes, for each of $N_t$ transmission antennas, an encoding part 1110, a mapping part 1112, a serial to parallel conversion part (S/P) 1113, a fast Fourier transform part (FFT) 1102, a virtual sub-carrier setting part 1104, an inverse fast Fourier transform part (IFFT) 1106, a parallel to serial conversion part (P/S) 1108, a guard interval adding part (GI) 1114, a digital to analog conversion part (D/A) 1116, a frequency conversion part (U/C) 1118 and a transmission antenna 1120.

The fast Fourier transform part 1102 carries out fast Fourier transform on transmitted signals, and outputs N sub-carrier components. The virtual sub-carrier setting part 1104 forces sub-carrier components (for example, the p-th sub-carrier) to set as the virtual sub-carriers, from among the N sub-carriers, into zero, and outputs the same. The sub-carriers other than the virtual sub-carriers are output as they are without being changed. The inverse fast Fourier transform part 1106 carries out inverse fast Fourier transform on the given group of signals, and returns them into signals in a time domain. Which sub-carriers should be set as the virtual sub-carriers are predetermined between the transmitter and a receiver, or, previously set by the system.

The encoding parts 1110-1 through $N_t$ carry out appropriate encoding such as convolution encoding, an error correction encoding or such. The mapping parts 1112-1 through $N_t$ map the transmitted signals in appropriate points on a constellation according to an appropriate modulation method. The guard interval adding part 1114-1 through $N_t$ add guard intervals to the signals. The digital to analog conversion part 1116-1 through $N_t$ convert digital signals into analog signals. The frequency converting parts 1118-1 through $N_t$ change the analog signals into high-frequency signals. The transmission antennas 1120-1 through $N_t$ transmit the transmitted signals independently.

Figure 12:
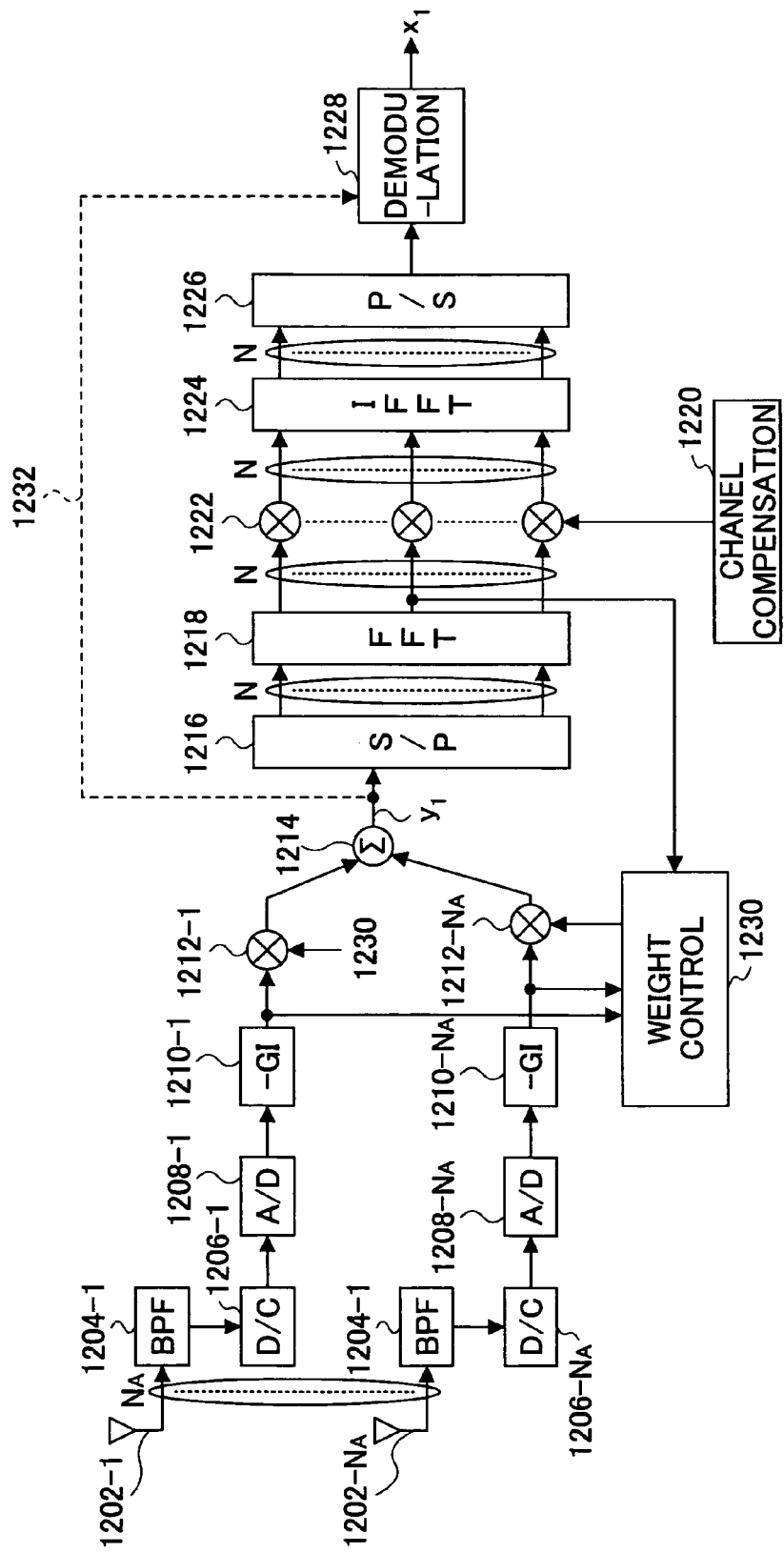
FIG. 12 shows a block diagram of a receiver in one embodiment of the present invention.

FIG. 12 shows a block diagram of a receiver in an embodiment of the present invention. In the embodiment, corresponding to the transmitter of FIG. 11, the single-carrier MIMO method is adopted. It is noted that, for the purpose of simplification, only a part concerning the first transmitted signal $x_1$ and the first received signal $y_1$ is shown. The receiver has a plurality of ($N_A$) antenna elements 1202-1 through $N_A$, $N_A$ band pass filters 1204-1 through $N_A$, $N_A$ frequency converting parts (D/C) 1206-1 through $N_A$, $N_A$ analog to digital conversion parts (A/D) 1208-1 through $N_A$, $N_A$ guard interval removing parts (-GI) 1210-1 through $N_A$, $N_A$ weight multiplying parts 1212-1 through $N_A$, an adding part 1214, a serial to parallel conversion part (S/P) 1216, a fast Fourier transform part (FFT) 1218, a channel compensation part 1220, a several (N) sub-carrier multiplying part 1222, an inverse fast Fourier transform part (IFFT) 1224, a parallel to serial conversion part (P/S) 1226, a demodulation part 1228 and a weight control part 1230.

The $N_A$ antennas 1202-1 through $N_A$ are determined in their positional relationship such that the entirety of the $N_A$ form a single adaptive array antenna. The band-pass filters 1204-1 through $N_A$ limit a signal band for the respective antenna elements. The frequency converting parts 1206-1 through $N_A$ covert the high-frequency signals into low-frequency signals.

The analog to digital conversion parts 1208-1 through $N_A$ convert the analog signals into digital signals. The guard interval removing parts (-GI) 1210-1 through $N_A$ remove signal parts correspond to the guard intervals from the signals received by the respective antenna elements. The weight multiplying parts 1212-1 through $N_A$ multiply weight factors to the signals received by the antenna elements, respectively. The adding part 1214 combines the thus-weighted received signals.

The serial to parallel conversion part 1216 converts the thus-combined signal into N parallel signals. The fast Fourier transform part 1218 carries out fast Fourier transform on the received signal, and the N sub-carrier components included in the received signals are output. The channel compensation part 1220 obtains a channel estimated value and corrects the received signal for each sub-carrier in such a manner that signal distortion introduced in the channel is compensated. The inverse fast Fourier transform part 1224 carries out inverse fast Fourier transform on the input signal group, and outputs the signal group in a time domain. The parallel to serial conversion part 1226 converts the thus-obtained signal group into serial signals. The demodulation part 1228 carries out data demodulation, and outputs the demodulation result to a decoding part (not shown). The weight control part 1230 calculates weight factors based on some of the signals from the respective antenna elements and the signals from the fast Fourier transform part 1218, and provides the weight factors to the weight multiplying parts 1212-1 through $N_A$. When frequency domain equalization is not carried out, as shown by a signal line 1232 of a broken line, the channel compensation part 1220, the several (N) sub-carrier multiplying part 1222, the inverse fast Fourier transform part (IFFT) 1224 and the parallel to serial conversion part (P/S) may be omitted, and the output $y_1$ of the adding part 1214 may be directly introduced to the demodulation part 1228. Thereby, the fast Fourier transform part 1218 should calculate only the sub-carriers set as the virtual sub-carriers, and thus, it is possible to simplify in comparison to the case of carrying out the frequency domain equalization.

Also in the present embodiment, the weight factors are determined in such a manner that the part of the output of the fast Fourier transform part 1218, i.e., the certain sub-carrier component (for example, the p-th sub-carrier component) of the received signals is suppressed. By providing these weight factors to the respective antennas via the weight multiplying parts, the directivity of the adaptive array antenna is such that null is oriented toward the coming direction of the signal other then the first transmitted signal $x_1$. When the p-th sub-carrier component is sufficiently suppressed, the signal demodulated based on the first received signal $y_1$ accurately indicates the first transmitted signal $x_1$. Thus, it is possible to apply the present invention to the communication system in the single carrier method. However, from the virtual sub-carriers introduced by the-virtual sub-carrier setting part 1104, the data transmission quality may somewhat degrade. Therefore, the present embodiment assumes that the degradation falls within such a range of degradation in the communication environment as that of a compensateable degree Embodiment 4

In the embodiments 1 through 3, the directivity of the adaptive array antenna is controlled while the sub-carrier component (for example, the p-th sub-carrier component for the first transmitted signal) which is the part of the received signals is suppressed. In the present embodiment, weight factors are calculated in such a manner that all the sub-carrier components of signals received during a certain period are suppressed.

Figure 13:
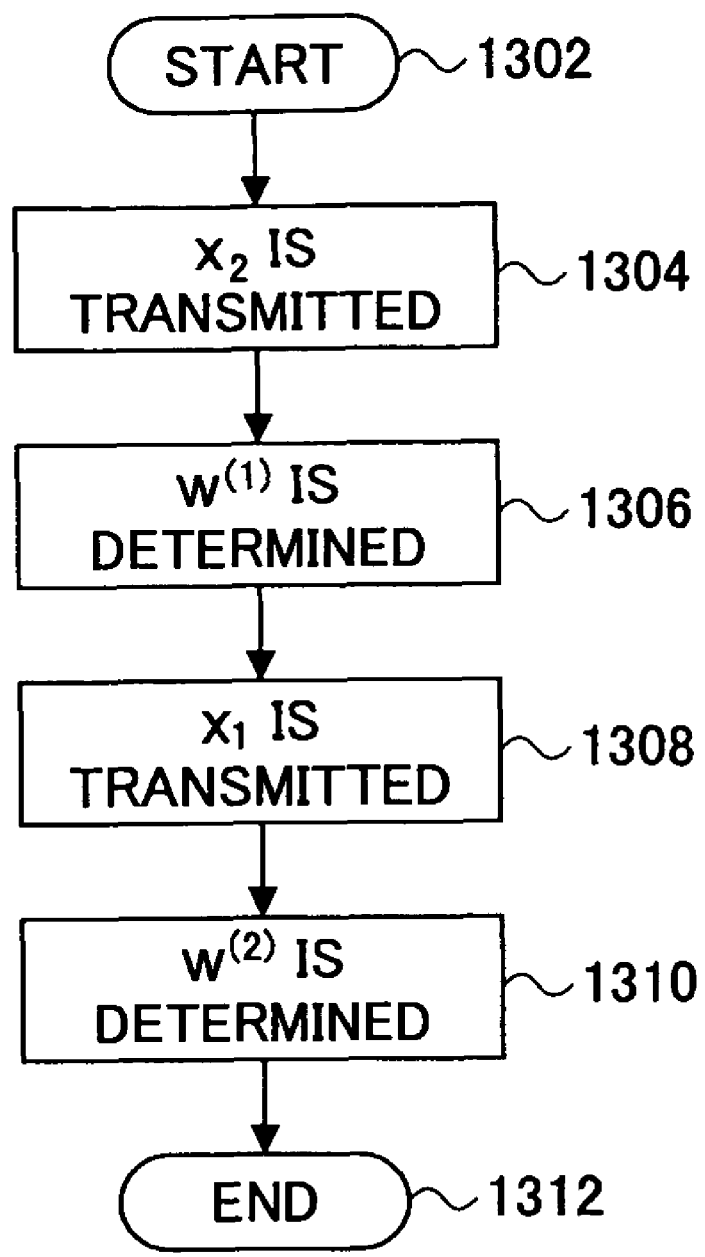
FIG. 13 shows a flow chart showing operation in one embodiment of the present invention.

FIG. 13 shows one example of a flow chart for carrying out such operation. For the sake of simplification, as shown in FIG. 7, it is assumed that the two types of transmitted signals $x_1$ and $x_2$ are transmitted from the two transmission antennas 710, 720. However, different from the example described with reference to FIG. 7, the first and second transmitted signals are transmitted separately in different slots. The flow starts from Step S1302, and is proceeded with to Step S1304.

In Step S1304, the second transmitted signal $x_2$ is transmitted from the second transmission antenna 720. In this case, the first transmitted signal $x_1$ is not transmitted.

In Step S1306, the receiver calculates a weight factor $w^{(1)}$ in such a manner that all the received signals are suppressed. In the received signals, only the second transmitted signal $x_2$ is included. A directivity pattern suppressing this signal is expected as being a pattern such that null is oriented to a coming direction of the second transmission signal $x_2$. Accordingly, the weight factor $w^{(1)}$ is used thereafter for suppressing the signals from the second antenna and receiving the signal from the first transmission antenna.

In Step S1308, the first transmitted signal $x_1$ is transmitted from the first transmission antenna 720. In this case, the second transmitted signal $x_2$ is not transmitted.

In Step S1310, the receiver calculates a weight factor $w^{(2)}$ in such a manner that all the received signals are suppressed. In the received signals, only the first transmitted signal $x_1$ is included. A directivity pattern suppressing this signal is expected as being a pattern such that null is oriented to a coming direction of the first transmission signal $x_1$. Accordingly, the weight factor $w^{(2)}$ is used thereafter for receiving the signal from the second transmission antenna.

The first and second weight factors are thus calculated, the flow of determining the weight factors are proceeded with to Step S1312, and then, is finished. After that, these weight factors are used, and the transmitted signals from the respective transmission antennas can be received while they can be distinguished.

Figure 14:
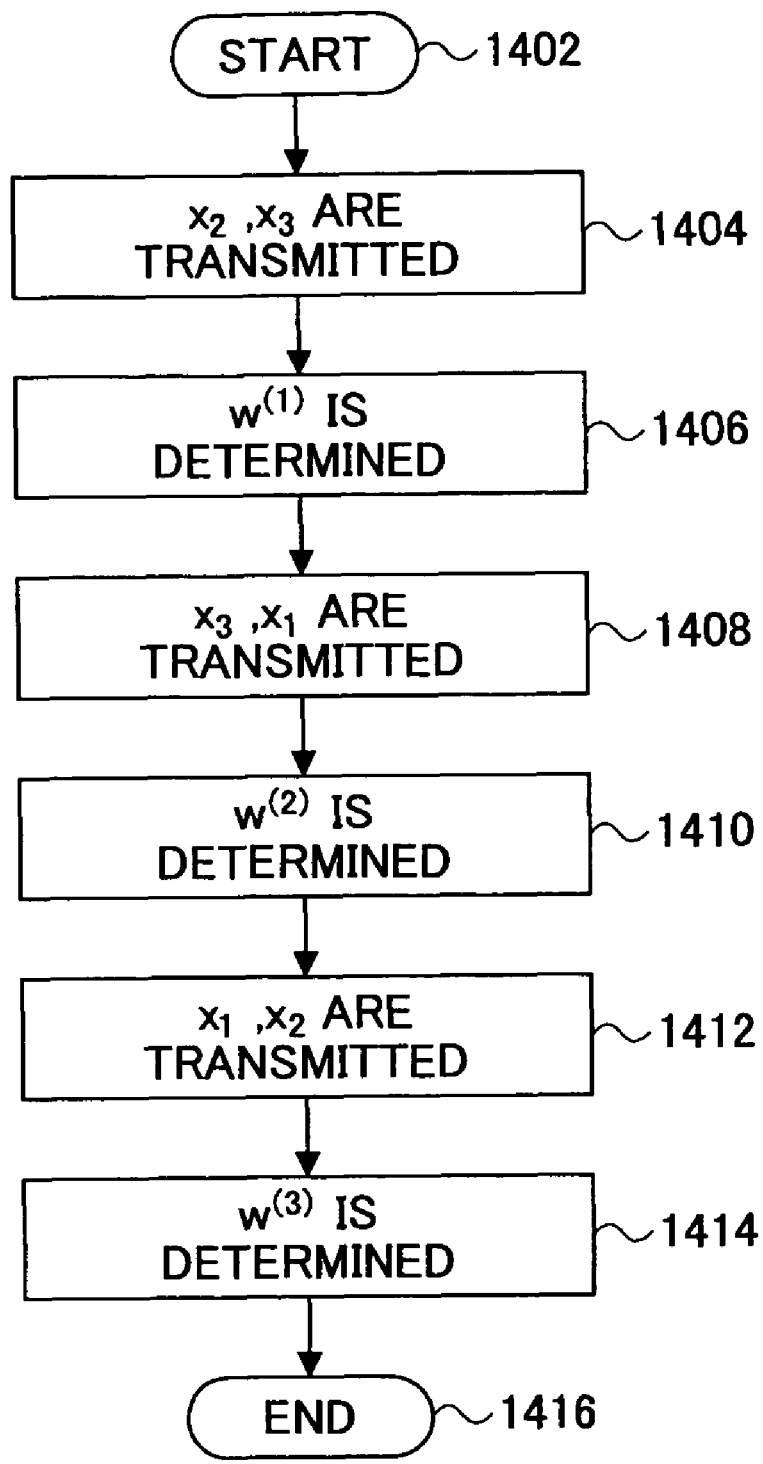
FIG. 14 shows a flow chart showing operation in one embodiment of the present invention.
Figure 15:
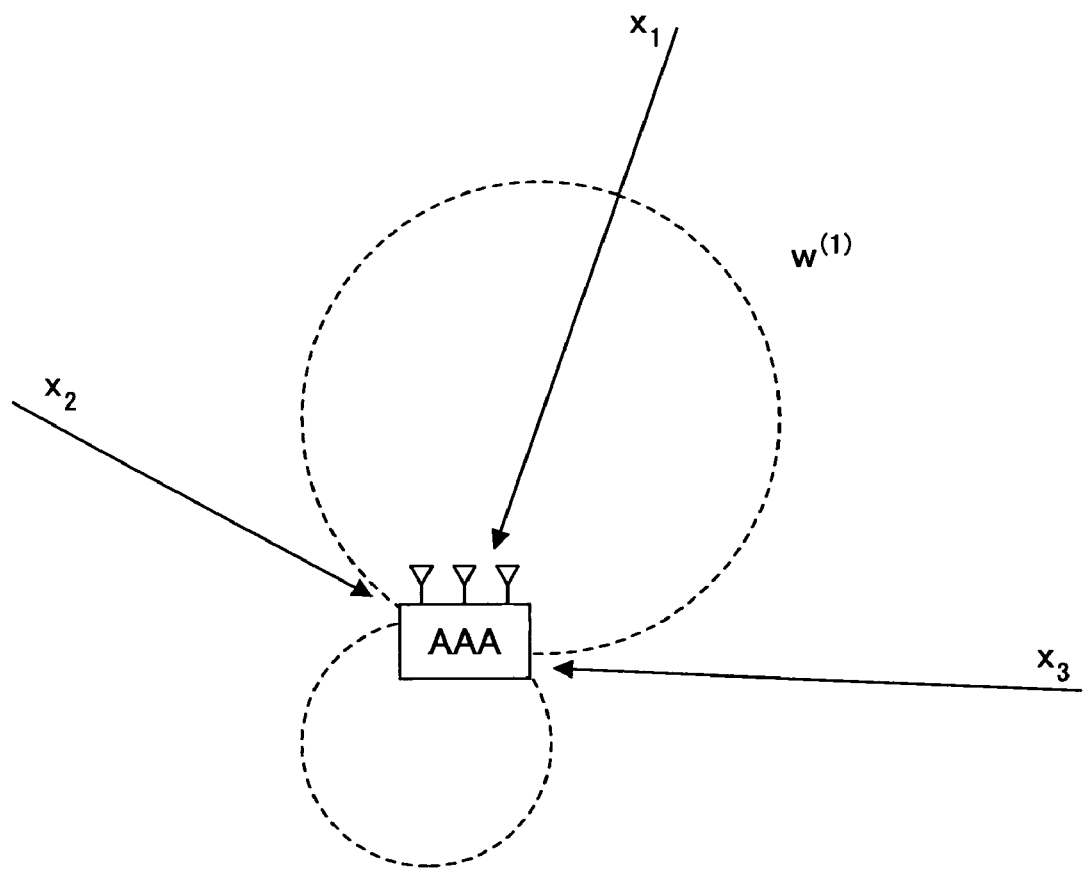
FIG. 15 shows relationship between a transmitted signal coming direction and a directivity.

FIG. 14 shows one example of a flow chart for determining three types of weight factors $w^{(1)}$, $w^{(2)}$ and $w^{(3)}$ when three types of transmitted signals $x_1$, $x_2$ and $X_3$ are transmitted from three transmission antennas. The flow starts from Step S1402, and then is proceeded with to Step S1404.

In Step S1404, the second and third transmitted signals $x_2$ and $X_3$ are transmitted simultaneously from the second and third transmission antennas. In this case, the first transmitted signal $x_1$ is not transmitted.

In Step S1406, the receiver calculates a weight factor $w^{(1)}$ in such a manner that all the received signals are suppressed. In the received signals, only the second and third transmitted signals $x_2$ and $x_3$ are included. A directivity pattern suppressing these signals is expected as being a pattern such that null is oriented to coming directions of the second and third transmission signals $x_2$ and $x_3$. Accordingly, the weight factor $w^{(1)}$ is used thereafter for receiving the first transmitted signal $x_1$ from the first transmission antenna.

In Step S1408, the third and first transmitted signals $x_3$ and $x_1$ are transmitted simultaneously from the third and first transmission antennas. In this case, the second transmitted signal $x_2$ is not transmitted.

In Step S1410, the receiver calculates a weight factor $w^{(2)}$ in such a manner that all the received signals are suppressed. A directivity pattern suppressing the received signals including the third and first transmitted signals is expected as being a pattern such that null is oriented to coming directions of the third and first transmitted signals $x_3$ and $x_1$. Accordingly, the weight factor $w^{(2)}$ is used thereafter for receiving the second transmitted signal $x_2$ from the second transmission antenna.

In Step S1412, the first and second transmitted signals $x_1$ and $x_2$ are transmitted simultaneously from the first and second transmission antennas. In this case, the third transmitted signal $X_3$ is not transmitted.

In Step S1414, the receiver calculates a weight factor $w^{(3)}$ in such a manner that all the received signals are suppressed. A directivity pattern suppressing the received signals including the first and second transmitted signals is expected as being a pattern such that null is oriented to coming directions of the first and second transmitted signals $x_1$ and $x_2$. Accordingly, the weight factor $w^{(3)}$ is used thereafter for receiving the third transmitted signal $X_3$ from the third transmission antenna.

Thus, the first, second and third weight factors are calculated, the flow of determining the weight factors is proceeded with to Step S1416, and is finished. Thereafter, these weight factors are used, and the transmitted signals from the respective transmission antennas can be received while they can be distinguished.

In the embodiment, the weight factors for receiving the first, second and third transmitted signals are obtained in the stated order. However, the determining order may be any order.

In the embodiment, the orthogonal frequency division multiplexing (OFDM) method is used. However, the present invention is not limited thereto. In the present invention, frequency disposition relationship should not be the orthogonal one, but multi-carriers should be used. Accordingly, the present invention can be utilized also in a frequency division multiplexing (FDM) method.

For the embodiments of the present invention, the description has been made for the examples in which, in the multi-output-type transmission device, the different information is output from the plurality of antennas, and the radio waves area distinguished.

For the MIMO method, a method also exists, other than the above-mentioned method, in which the same information is weighted and is put on all the antennas, thus radio beams are created, and, this is repeated with the use of a different weight, whereby a plurality of beams are created.

The present invention may also be utilized in the method in which the plurality of beams are thus created.

Figure 16:
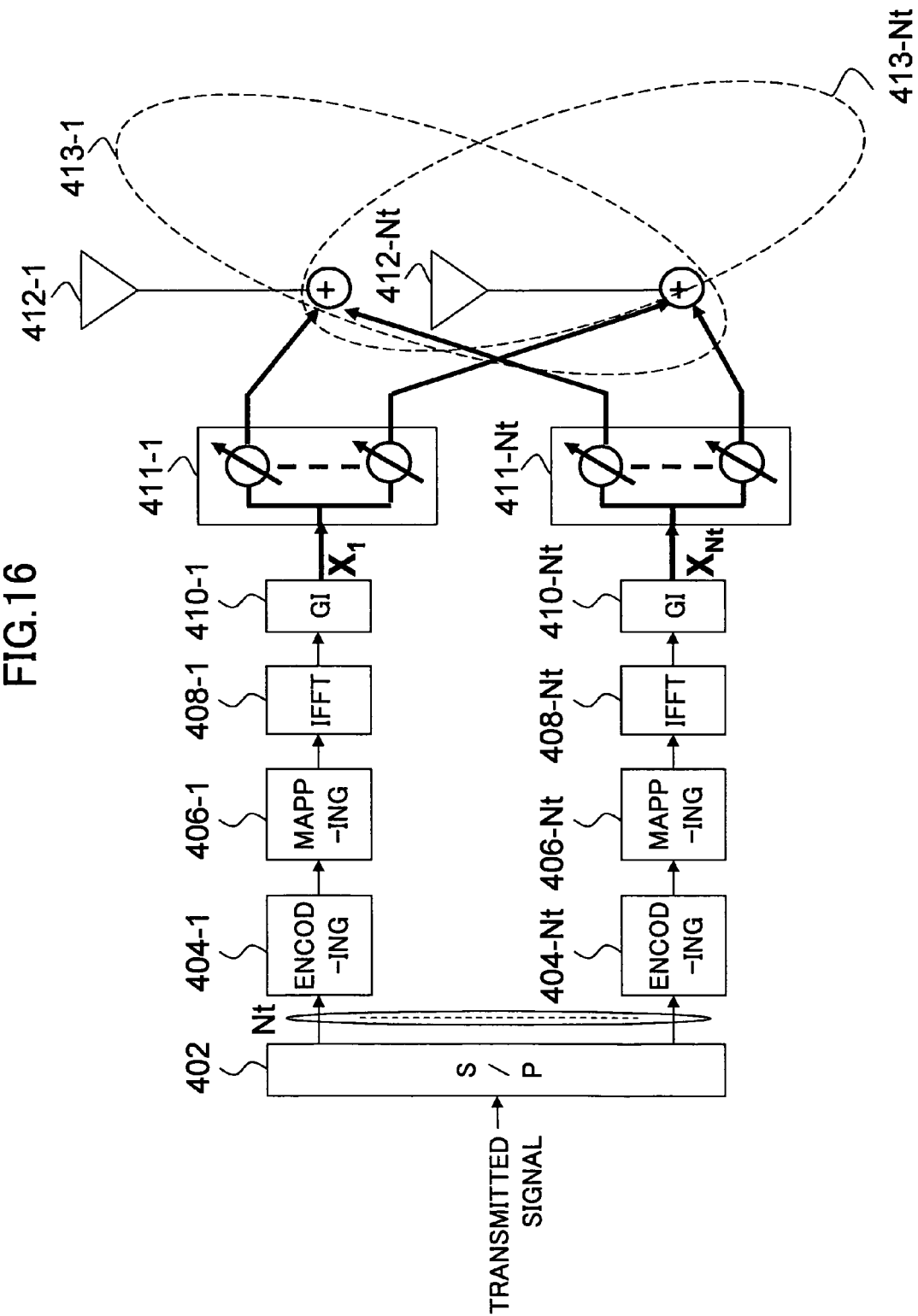
FIG. 16 shows a block diagram of a transmitter in one embodiment of the present invention.

FIG. 16 shows a specific example.

Figure 4:
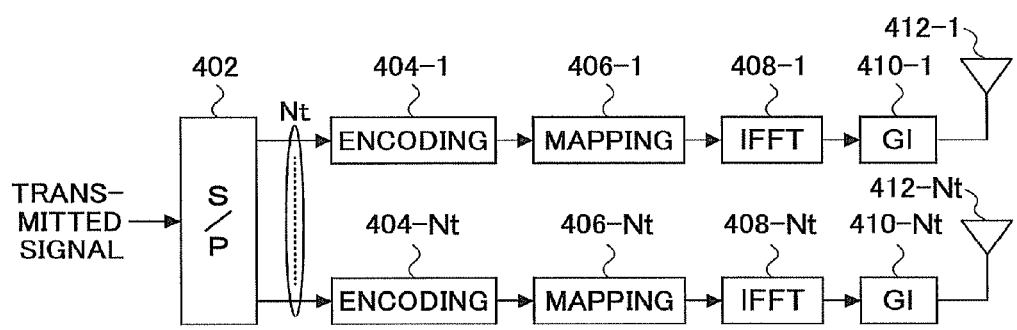
FIG. 4 shows a general outline of a transmitter in the MIMO method and the OFDM method.
Figure 5:
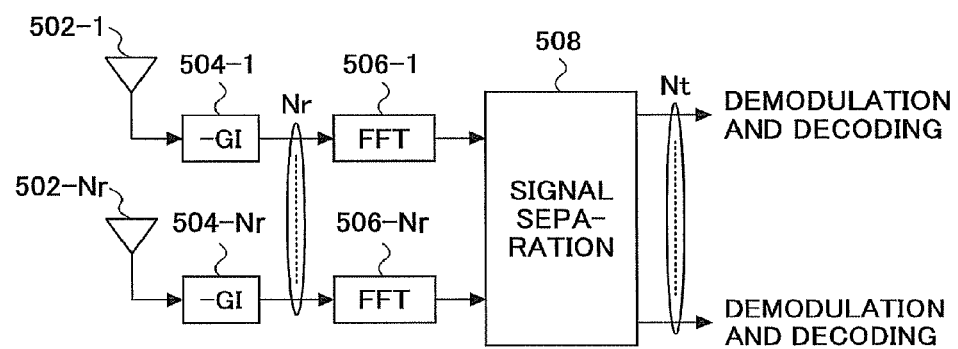
FIG. 5 shows a general outline of a receiver in the MIMO method and the OFDM method.

FIG. 16 is the same as FIG. 4 up to where the transmitted signals undergo serial to parallel conversion (S/P) 402, and the guard intervals are added. Accordingly, the description is omitted.

The transmitted signals are separated to correspond to the number of the antennas after having the guard intervals added thereto, and weighting processing 411-1 through 411-$N_t$ weights corresponding to the respective antennas.

The signals thus weighted in the weighing processing 411-1 through 411-$N_t$ are input to the antennas 42-1 through 412-$N_t$, respectively.

The antennas 412-1 through 412-$N_t$ cooperatively create radio wave beams 413-1 through 413-$N_t$.

Sub-carriers to be generated when inverse fast Fourier transform is carried out in this configuration are the same as those of the relationship of the sub-carriers of FIG. 8. That is, each of $X_1$ through $XN_t$ is such that, power of a channel having a different sub-carrier is made to be substantially zero.

Thereby, the beams 413-1 through 413-$N_t$ output from the plurality of antennas 412-1 through 412-$N_t$ are such that $X_1$ through $XN_t$ can be transmitted as the respective different beams according to the weighting of 411-1 through 411-$N_t$.

It would be obvious to the person skilled in the art that the present invention is not limited to the specific embodiments, and various improvements, modification, variations and so forth may be made.

What is claimed is:

1. A transmission device in a multi-output type, comprising:
    a plurality of antennas that generate in a multi-carrier manner at least a first beam outputting frequency multiplexed signals weighted by different values from the plurality of antennas, and a second beam outputting frequency multiplexed signals weighted by different values from the plurality of antennas, wherein:
    frequency zones in which no carrier is disposed are provided in multi-carriers output by the first beam and the second beam, for the purpose of distinguishing radio waves of the first beam and the second beam, wherein the frequency zones are different between the first beam and the second beam, and
    the plurality of antennas include three or more antennas that generate respective three or more beams, and one beam generated by one antenna of the three or more antennas does not output a signal while the other beams generated by the other antennas of the three or more antennas output respective signals.

2. The transmission device as claimed in claim 1, wherein:
    the one antenna of the three or more antennas is temporally changed sequentially among the three or more antennas.

3. A transmission device in a multi-output type, comprising:
    a plurality of antennas that generate in a multi-carrier manner at least a first beam outputting frequency multiplexed signals weighted by different values from the plurality of antennas, and a second beam outputting frequency multiplexed signals weighted by different values from the plurality of antennas, wherein:
    at least one frequency zone having substantially no carrier is provided in the frequency-multiplexed signals of the first beam,
    at least one frequency zone, different from the one frequency zone having substantially no carrier of the first beam, having substantially no carrier is provided in the frequency-multiplexed signals of the second beam, and
    the plurality of antennas include three or more antennas that generate respective three or more beams, and one beam generated by one antenna of the three or more antennas does not output a signal while the other beams generated by the other antennas of the three or more antennas output respective signals.

4. The transmission device as claimed in claim 3, wherein:
    the one antenna of the three or more antennas is temporally changed sequentially among the three or more antennas.

* * * * *